United States Patent

Gray

(10) Patent No.: US 11,644,112 B2
(45) Date of Patent: May 9, 2023

(54) SEAL FOR ROTARY PLUG VALVE

(71) Applicant: Robert Bosch GmbH, Stuttgart (DE)

(72) Inventor: Edward Gray, Bellows Falls, VT (US)

(73) Assignees: Robert Bosch LLC, Mt. Prospect, IL (US); Robert Bosch GmbH, Stuggart (DE)

(*) Notice: Subject to any disclaimer, the term of this patent is extended or adjusted under 35 U.S.C. 154(b) by 8 days.

(21) Appl. No.: 17/358,097

(22) Filed: Jun. 25, 2021

(65) Prior Publication Data

US 2022/0412473 A1    Dec. 29, 2022

(51) Int. Cl.
*F16K 11/083* (2006.01)
*F16K 27/06* (2006.01)
*F01P 7/14* (2006.01)

(52) U.S. Cl.
CPC .......... *F16K 11/083* (2013.01); *F16K 27/062* (2013.01); *F01P 7/14* (2013.01); *F01P 2007/146* (2013.01)

(58) Field of Classification Search
CPC ........ F16K 11/083; F16K 27/062; F01P 7/14; F01P 2007/146
USPC ........................................................ 251/309
See application file for complete search history.

(56) References Cited

U.S. PATENT DOCUMENTS

| 2,119,766 | A | * | 6/1938 | Aderhold, Jr. | .......... | F16K 5/222 137/246.14 |
| 2,146,910 | A | * | 2/1939 | Nordstrom | ............. | F16K 41/00 137/246.11 |
| 2,235,306 | A | * | 3/1941 | Atkinson | ................ | F16K 5/222 251/355 |
| 2,621,888 | A | * | 12/1952 | Allen | .................... | F16K 5/0271 251/316 |
| 2,658,713 | A | * | 11/1953 | Scherer | ..................... | F16K 5/22 137/246.18 |
| 2,954,961 | A | | 10/1959 | Stogner et al. | | |
| 2,986,156 | A | * | 5/1961 | Volpin | .................... | F16K 5/222 137/246.12 |
| 2,999,510 | A | * | 9/1961 | Volpin | .................... | F16K 5/222 137/246.12 |
| 3,216,698 | A | * | 11/1965 | Bouchard | ............. | F16K 5/0271 251/317 |
| 3,479,006 | A | | 11/1969 | Brown | | |
| 3,509,903 | A | * | 5/1970 | Luckenbill | ............ | F16K 5/0271 137/246.15 |
| 3,521,856 | A | * | 7/1970 | Smith | ..................... | F16K 5/163 137/246.22 |
| 3,589,679 | A | * | 6/1971 | Birk | ....................... | F16K 11/083 251/317 |
| 3,682,490 | A | * | 8/1972 | Lunt | ....................... | F16K 41/10 277/529 |

(Continued)

*Primary Examiner* — Hung Q Nguyen
*Assistant Examiner* — Anthony Donald Taylor, Jr.
(74) *Attorney, Agent, or Firm* — Kelly McGlashen

(57) ABSTRACT

A multi-port rotary plug valve may be used in a fluid delivery system of a vehicle to control flow of coolant fluid between a radiator, an electric drive motor, a battery, vehicle electronics, and one or more bypass lines. The valve may include a valve body that has ports at two or more levels along a height dimension of the valve body and a plug assembly that is rotatably disposed in the valve body. In addition, the valve may include a single-piece, conical seal disposed between the valve body and the plug assembly that is free of seams or joints.

14 Claims, 12 Drawing Sheets

(56) References Cited

U.S. PATENT DOCUMENTS

| | | | | |
|---|---|---|---|---|
| 3,787,028 A | * | 1/1974 | Semon | F16K 5/185 |
| | | | | 251/317 |
| 3,916,943 A | * | 11/1975 | Hester | F16K 5/025 |
| | | | | 251/317 |
| 3,930,635 A | * | 1/1976 | Smith | F16K 5/0271 |
| | | | | 251/317 |
| 4,215,847 A | * | 8/1980 | Hoos | F16K 5/0471 |
| | | | | 251/317 |
| 4,286,625 A | * | 9/1981 | Tomlin | F16K 11/0833 |
| | | | | 251/285 |
| 4,385,746 A | * | 5/1983 | Tomlin | F16K 11/0833 |
| | | | | 251/192 |
| 4,410,003 A | * | 10/1983 | Sandling | F16K 27/062 |
| | | | | 251/312 |
| 4,494,730 A | * | 1/1985 | George | F16K 27/062 |
| | | | | 251/309 |
| 4,506,696 A | * | 3/1985 | von Pechmann | F16K 5/182 |
| | | | | 251/312 |
| 4,510,966 A | * | 4/1985 | Parsons, Jr. | F16K 5/166 |
| | | | | 277/362 |
| 4,711,264 A | * | 12/1987 | Medvid | F16K 49/00 |
| | | | | 251/312 |
| 5,326,074 A | * | 7/1994 | Spock, Jr. | F16K 41/046 |
| | | | | 251/312 |
| 5,901,944 A | * | 5/1999 | Ramakrishnan | F16K 5/0271 |
| | | | | 251/304 |
| 2013/0026405 A1 | | 1/2013 | O'Coin et al. | |
| 2018/0073654 A1 | * | 3/2018 | Nowell | F16K 27/065 |
| 2018/0266573 A1 | * | 9/2018 | Nowell | F16K 5/0471 |
| 2018/0363784 A1 | * | 12/2018 | Corso | F16K 1/42 |
| 2020/0025296 A1 | * | 1/2020 | Cuiper | F16K 5/184 |

* cited by examiner

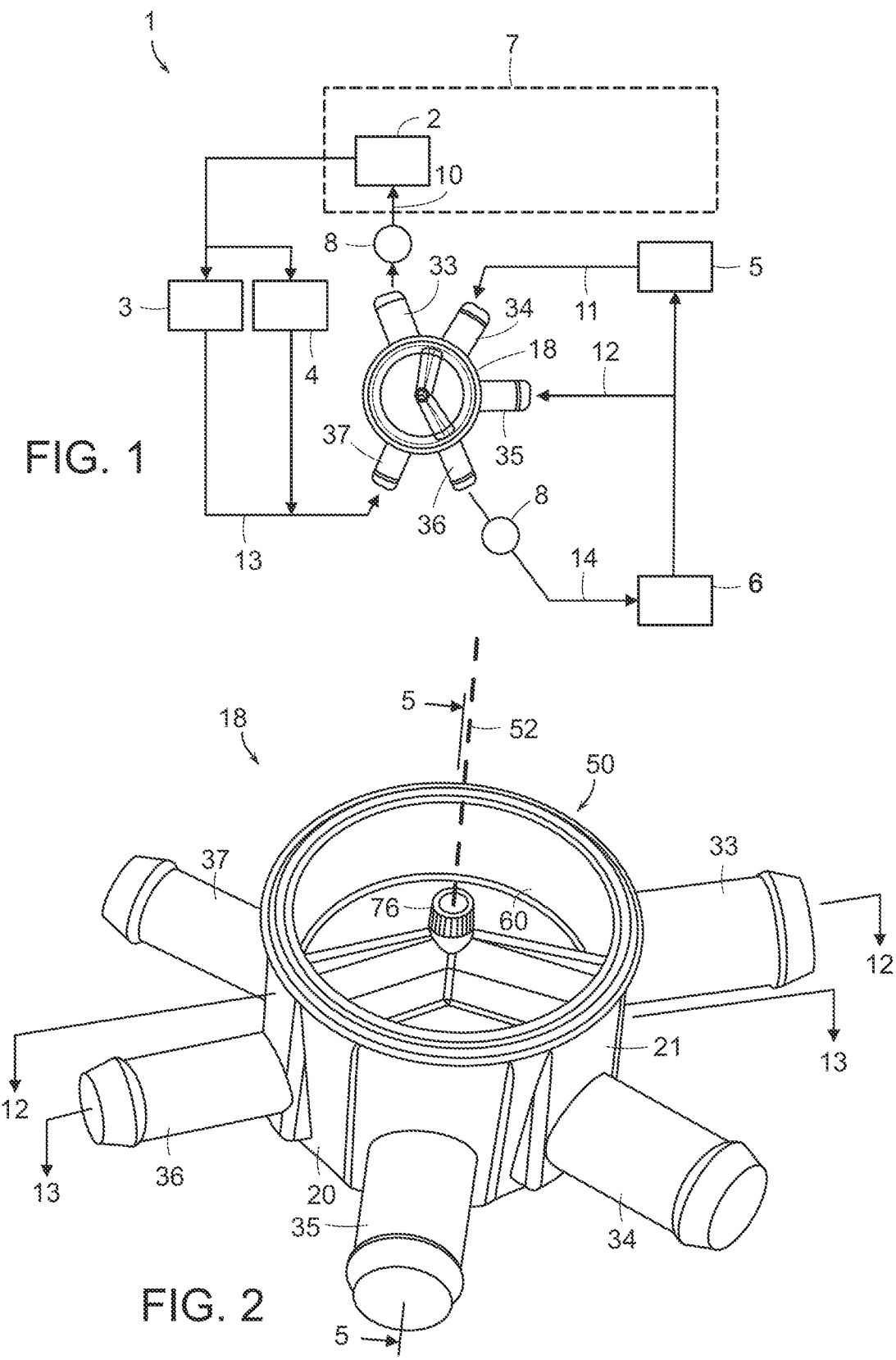

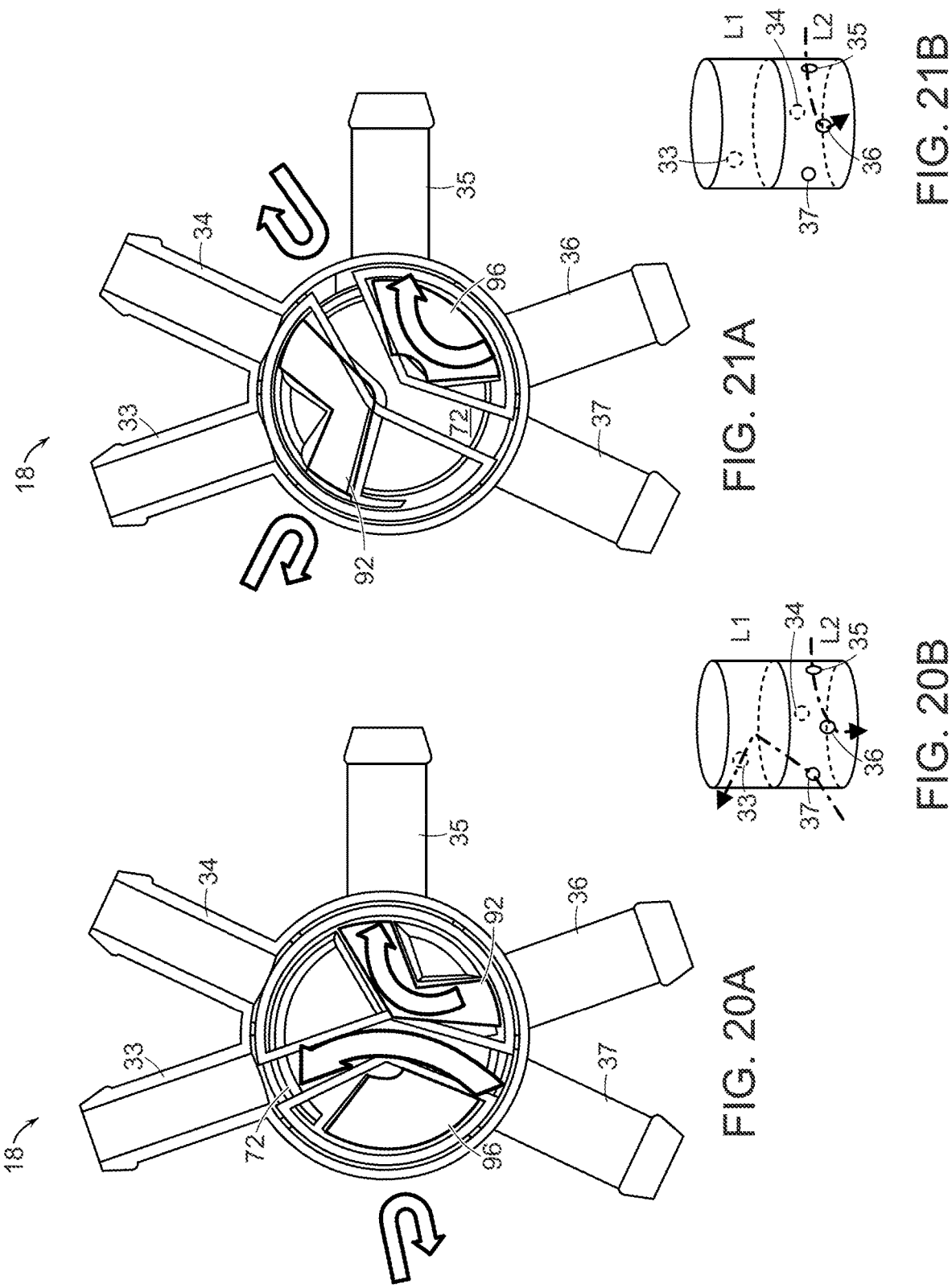

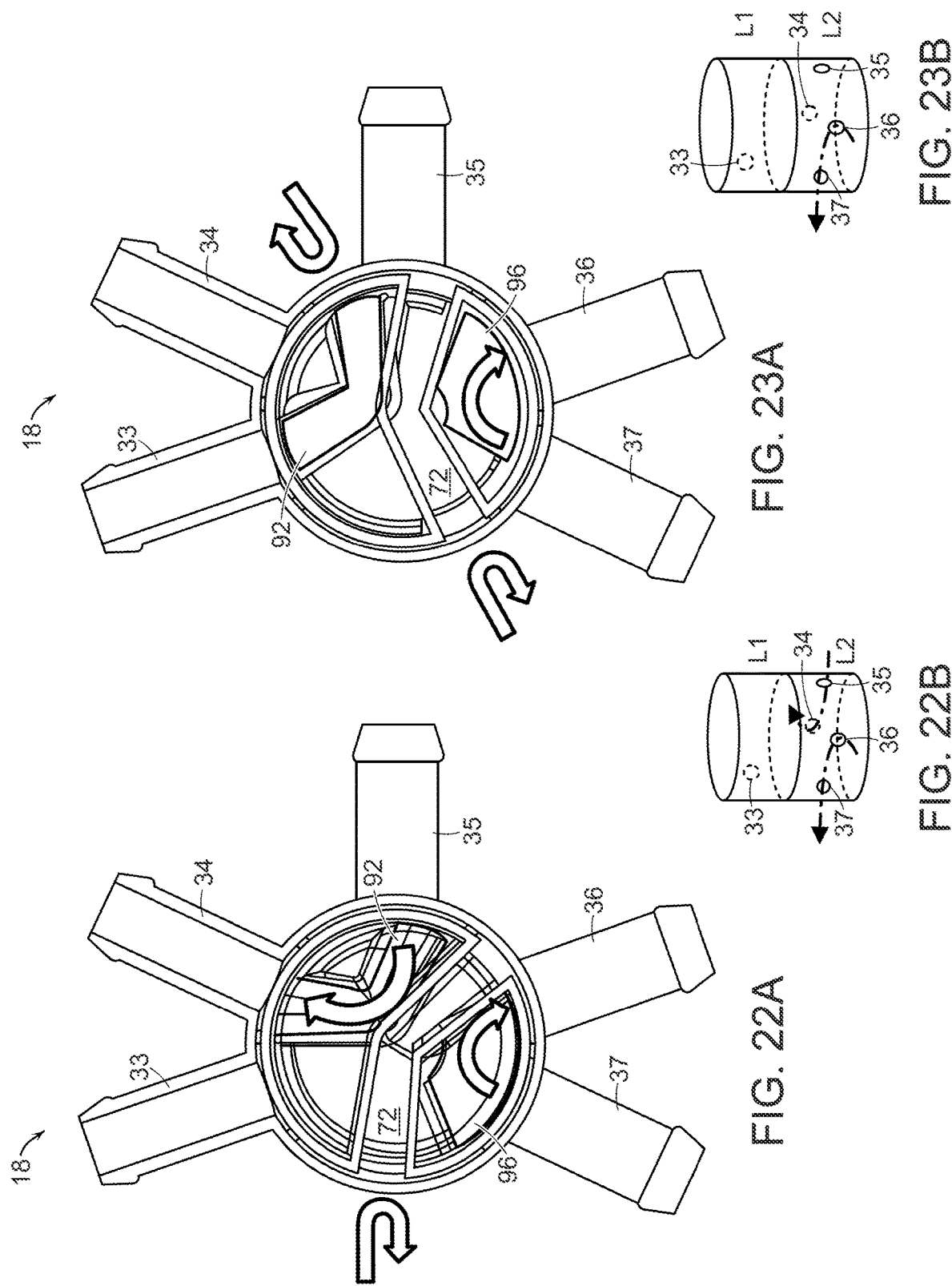

SEAL FOR ROTARY PLUG VALVE

BACKGROUND

A rotary plug valve is a type of directional control valve that may be used in a fluid delivery system to control fluid flow and distribution through the system. For example, rotary plug valves may be used to control the flow of coolant through a vehicle cooling system. The rotary plug valve may include a valve body that defines several ports, a valve plug disposed in the valve body, and a seal disposed between the valve body and the valve plug. The valve plug is shaped to distribute the flow to predetermined ports for certain rotational orientations of the valve plug within the valve body and is rotated relative to the valve body to control flow through the valve.

SUMMARY

Complex fluid delivery systems may require a rotary plug valve that is capable of controlling fluid flow between three, four, five or more individual ports of the valve body. Depending on the system requirements, it may be desirable to close several flow paths simultaneously. For example, in a five-port rotary plug valve, it may be desirable to close as many as three of five flow paths for a given rotational orientation of the valve plug relative to the valve body. This requires that a large angular portion of the valve plug have no passageway openings. If all the valve ports in the valve body are on the same level along a height dimension of the valve body, the area available for closed ports is limited. In the rotary plug valve disclosed herein, the flow paths of the valve plug are separated into two levels, which provides a larger area on the plug without a passageway opening to meet a valve body port. However, a multi-level valve plug may be complicated to fabricate and require a complicated mold and/or molding process. In one solution, the interface between the valve body and valve plug may have a conical shape, making it possible to mold the valve seal (also referred to as a valve seat) as a single, monolithic structure in a simple two part mold. However the conical shape then makes it difficult to mold the valve plug in a simple two part mold without creating areas with large wall thickness, a configuration that is associated with poor dimensional control of the part. To address this issue, the valve plug is formed in portions, which allows the coring (e.g., removal of material) of the area inside the conical shape defined by the valve plug, and outside the passageways.

In some fluid delivery systems having, for example, thermal applications, it may be desirable to close of two or three of the ports in a given valve plug rotational position. For example, a multi-port rotary plug valve may be used in a cooling system of an electric vehicle to control flow of coolant fluid between a radiator, an electric drive motor, a battery, vehicle electronics, and one or more bypass lines. The rotary plug valve may include a valve body that has ports at two or more levels along a height dimension of the valve body. The rotary plug valve may include a plug assembly that is disposed in the valve body and is rotatable relative to the valve body about a rotational axis that is parallel to the height direction of the valve body. In addition, the rotary plug valve may include a seal disposed between the valve plug and the valve body.

The plug assembly may be made of two interlocking parts (e.g., first and second plug portions) that cooperate to control fluid flow through the valve body. The plug assembly may have more than two openings to divert fluid to the different levels. The addition of levels and corresponding plug openings makes it possible to provide valve configurations corresponding to certain rotational positions of the valve plug relative to the valve body in which fluid passageways extend between levels, are restricted to a single level, or in which no ports of the valve body are open. This can be compared to some conventional rotary plug valves that only allow for the closing of one port at a time. The plug assembly provides some passageways that can access ports on multiple levels and others that can only access one level. The two-part plug assembly simplifies molding of a valve plug that can service the additional port levels. The valve body and plug assembly may be tapered along the rotational axis in order to simplify manufacture and improve sealing.

The seal may have a conical shape when viewed in a direction perpendicular to the rotational axis of the plug assembly. By forming the seal in a conical shape it can be formed as a single-piece or monolithic structure in a simple, two-part mold. Since the seal is a single-piece or monolithic structure, it is free of seams or joints. This is advantageous as compared to some conventional seals that include seams or joints, since such seams or joints may sometimes be a source of fluid leakage.

The seal has a cage-like structure that permits the seal to seal a valve body having any number of ports or port levels. In particular, the seal includes a first ring that seals an upper periphery of the plug assembly, a second ring that seals a lower periphery of the valve plug assembly, and ribs that extend between the first and second rings. In particular, a rib is disposed between each pair of adjacent valve ports. The plug assembly-facing surface of each rib includes a channel that extends between the first ring and the second ring. In some embodiments, the two lands that bound the channel may serve to prevent contaminant particles and/or other debris from being trapped in the seal/plug interface, whereby abrasive wear is reduced. In some embodiments, the channel may serve to reduce seal surface area and thus reduce friction between the seal and the plug assembly.

In some aspects, a valve seal includes a first ring having a first ring diameter, and a second ring that is parallel to, and spaced apart from, the first ring. The second ring has a second ring diameter that is different than the first ring diameter. In addition, the valve seal includes a first rib that extends between the first ring and the second ring, and a second rib that extends between the first ring and the second ring, the second rib being spaced apart from the first rib along a circumference of the first ring.

In some embodiments, the seal is formed integrally as a single unit whereby the seal is free of a seam.

In some embodiments, the inward-facing surfaces of each of the first rib and the second rib include a channel that extends between the first ring and the second ring.

In some embodiments, the channel has a V shaped profile.

In some embodiments, the inward-facing surfaces of the first rib and the second rib include a pair of parallel lands. One land of the pair of lands is disposed on each side of the channel, and the lands provide a sealing contact surface of the seal.

In some embodiments, the outward facing surfaces of the first rib and the second rib have a rectangular profile.

In some embodiments, the spacing about a circumference of the seal between ribs is irregular.

In some embodiments, the seal is formed of an elastic material.

In some embodiments, the seal is formed of low friction elastomer.

In some embodiments, a portion of the surfaces of the seal include a low-friction coating.

In some aspects, a rotary plug valve includes a valve body, a valve plug disposed in the valve body and a seal that is disposed between the valve body and the valve plug. The valve body includes a body sidewall that encircles and is centered on a body axis, a body base that closes one end of the body sidewall, the body sidewall and body base cooperating to define a valve body chamber, and valve ports, each valve port communicating with the valve body chamber. The valve plug is disposed in the valve body chamber so as to be rotatable relative to the valve body about a rotational axis that coincides with the body axis. The valve plug includes a plug first end, a plug second end opposed to the plug first end, a side surface that extends between the first end and the second end, the side surface surrounding the body axis, and passageways that extend through the valve plug and open at the side surface of the valve plug. In addition, the seal includes a first ring having a first ring diameter, and a second ring that is parallel to, and spaced apart from, the first ring. The second ring has a second ring diameter that is different than the first ring diameter. The seal includes a first rib that extends between the first ring and the second ring, and a second rib that extends between the first ring and the second ring. The second rib is spaced apart from the first rib along a circumference of the first ring.

In some embodiments, the seal is formed integrally as a single unit whereby the seal is free of a seam.

In some embodiments, the inward-facing surfaces of the first rib and the second rib face the valve plug, and the inward-facing surface of each rib includes a channel that extends between the first ring and the second ring.

In some embodiments, the channel has a V shaped profile.

In some embodiments, the inward-facing surfaces of each of the first rib and the second rib include a pair of parallel lands. One land of the pair of lands is disposed on each side of the channel, and the lands provide a sealing contact surface between the seal and the valve plug.

In some embodiments, the outward facing surfaces of each of the first rib and the second rib have a rectangular profile.

In some embodiments, the outward-facing portions of the first rib and the second rib are received in grooves provided in the body sidewall.

In some embodiments, the shape and dimensions of outward-facing portions of the first rib and the second rib correspond to the shape and dimensions of the grooves.

BRIEF DESCRIPTION OF THE FIGURES

FIG. 1 is a schematic of a vehicle cooling system including a multi-level, multi-port rotary plug valve.

FIG. 2 is a perspective view of the multi-level, multi-port rotary plug valve of FIG. 1.

FIGS. 20A and 20B illustrate fluid flow through the valve plug of the rotary plug valve of FIG. 2 for one rotational position of the plug assembly relative to the valve body, where solid arrows represent fluid flow through the valve plug, and open arrows represent a blocked flow path.

FIGS. 21A and 21B illustrate fluid flow through the valve plug of the rotary plug valve of FIG. 2 for another rotational position of the plug assembly relative to the valve body, where solid arrows represent fluid flow through the valve plug, and open arrows represent a blocked flow path.

FIGS. 22A and 22B illustrate fluid flow through the valve plug of the rotary plug valve of FIG. 2 for another rotational position of the plug assembly relative to the valve body, where solid arrows represent fluid flow through the valve plug, and open arrows represent a blocked flow path.

FIGS. 23A and 23B illustrate fluid flow through the valve plug of the rotary plug valve of FIG. 2 for another rotational position of the plug assembly relative to the valve body, where solid arrows represent fluid flow through the valve plug, and open arrows represent a blocked flow path.

DETAILED DESCRIPTION

Figure 3:
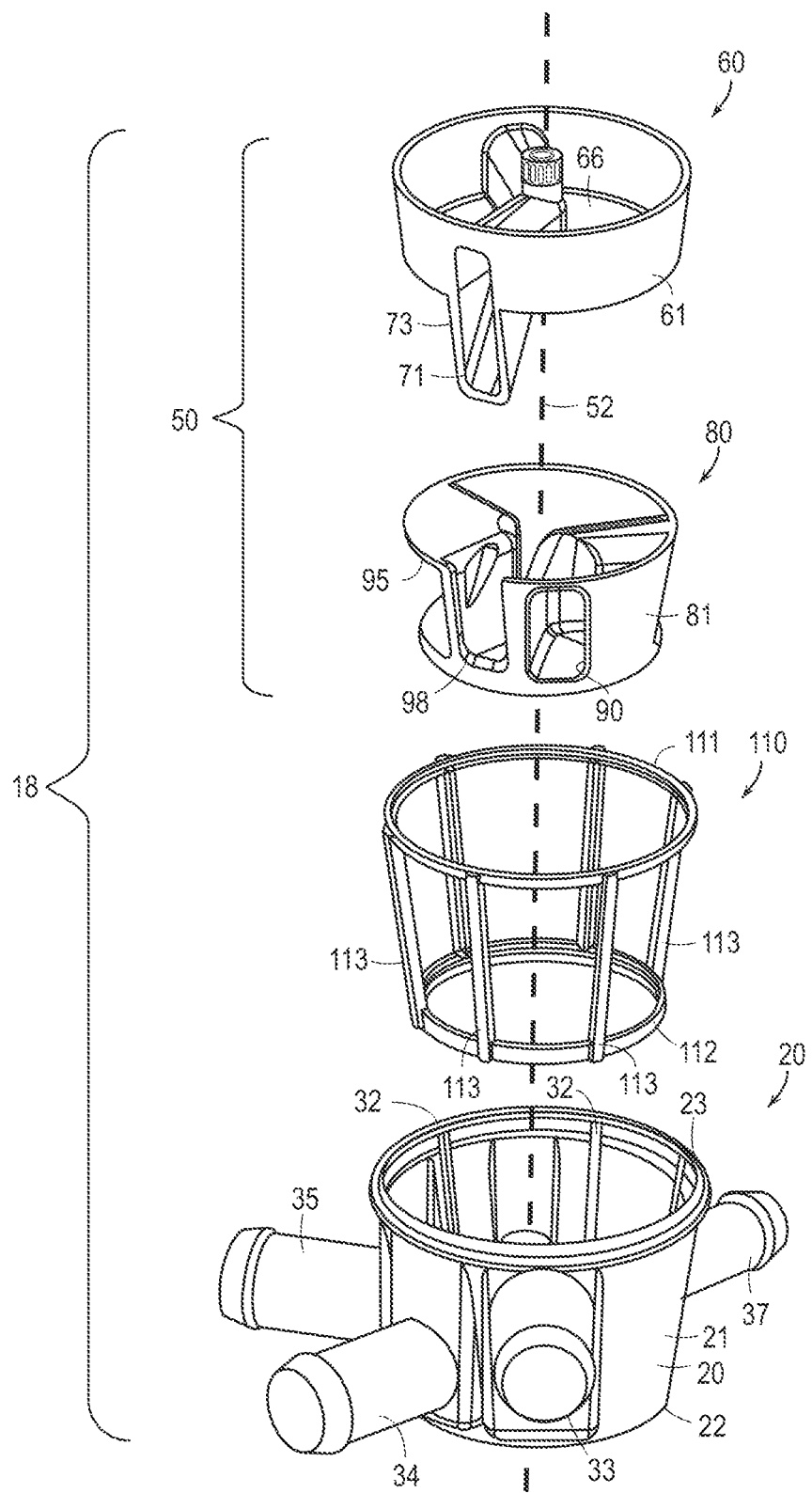
FIG. 3 is an exploded perspective view of the rotary plug valve of FIG. 2.

Referring to FIGS. 1-3, a fluid delivery system 1 includes a multi-level, multi-port rotary plug valve 18 that is capable of controlling fluid flow driven by a pump 8 between three, four, five or more individual fluid lines 10, 11, 12, 13, 14 within the system 1. The rotary plug valve 18 may be may be used, for example, to control the distribution and flow of coolant in a cooling system 1 of an electric vehicle. In this example, the rotary plug valve 18 may control flow of coolant fluid between the rotary plug valve 18 and a radiator 2 that is part of a vehicle passenger cabin heating and cooling system 7, where coolant from the radiator 2 may also cools a battery 3 and battery management system 4. In addition, the rotary plug valve 18 may control fluid flow to heat exchangers 5, 6 that support temperature control of other vehicle devices and systems, such as an electric drive motor, vehicle electronics and/or electronic control units and/or the oil supply. The rotary plug valve 18 includes a valve body 20 and a plug assembly 50 that is disposed in, and rotates relative to, the valve body 20 about a rotational axis 52. In addition, the rotary plug valve 18 has a single, elastomeric valve seal 110 that provides a fluid-tight seal between the valve body 20 and the plug assembly 50. The valve body 20 includes multiple valve ports 33, 34, 35, 36, 37, the number of ports being determined by the specific application. At least one valve port 33 is positioned at a different level along a height dimension of the valve body 20 than the other valve ports 34, 35, 36, 37, where the height dimension is measured in a direction parallel to the rotational axis 52. The rotational orientation of the plug assembly 50 relative to the valve body 20 is set via an actuator (not shown). The rotational orientation of the plug assembly 50 relative to the valve body 20 determines one or more fluid flow paths through corresponding ones of the valve ports 33, 34, 35, 36, 37. The plug assembly 50 may be an assembly of two interlocking plug portions 60, 80 that together control fluid flow through the valve body 20. The plug assembly 50 has multiple openings associated with passageways 72, 92, 96 that, depending on the rotational orientation of the plug assembly 50 relative to the valve body 20, divert fluid to certain ones of the valve ports 33, 34, 35, 36, 37, whereby the distribution of coolant fluid in the coolant system 1 is controlled. Details of the rotary plug valve 18, including the valve body 20, the plug assembly 50 and the seal 110, will now be described.

Figure 4:
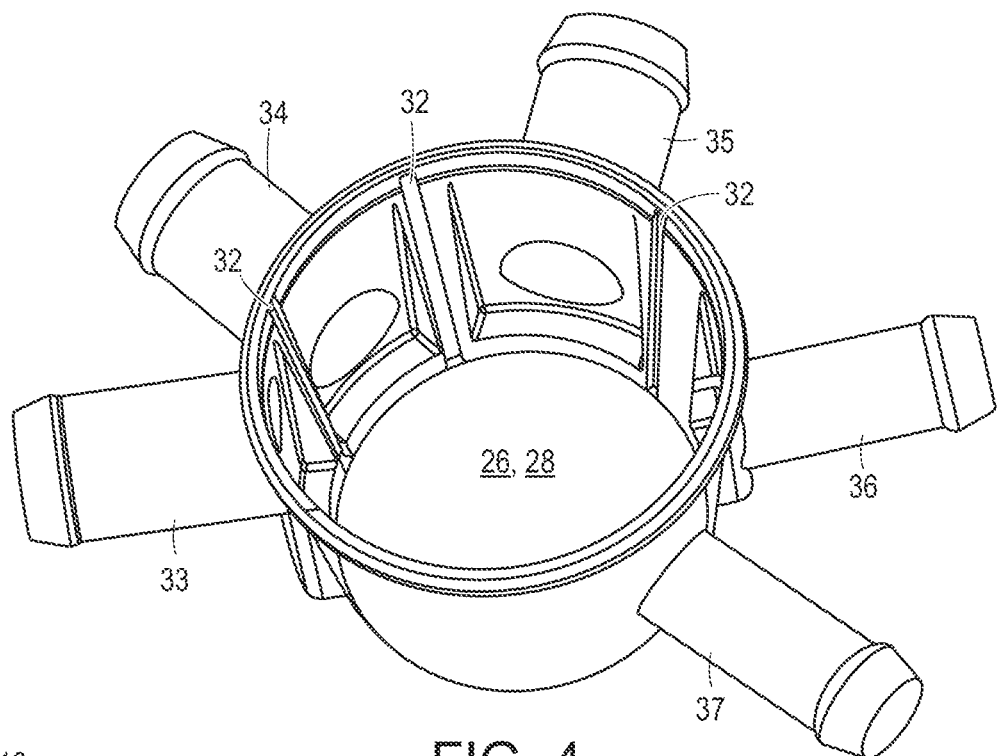
FIG. 4 is a perspective view of the valve body of the rotary plug valve of FIG. 2.
Figure 5:
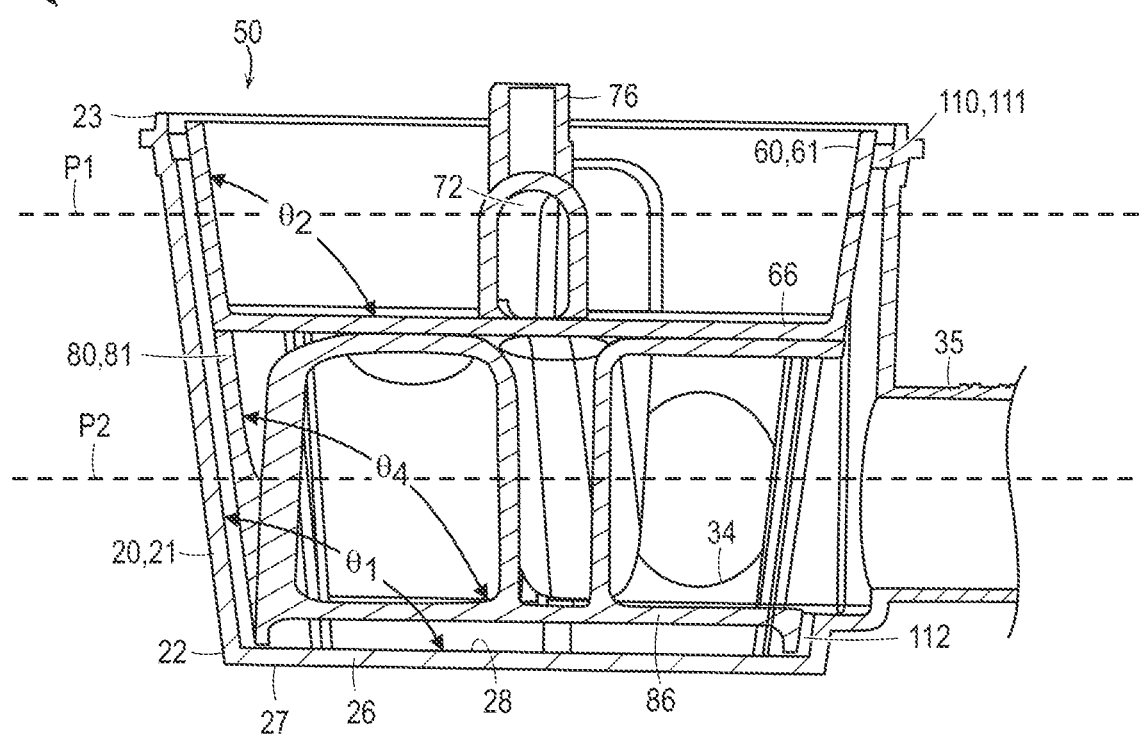
FIG. 5 is a cross-sectional view of the rotary plug valve as seen along line 5-5 of FIG. 2.

Referring to FIGS. 4 and 5, the valve body 20 includes a base 26, and a sidewall 21. The base 26 has a circular profile when viewed in a direction parallel to the rotational axis 52. The sidewall 21 is joined at one end (referred to here as the "base end") 22 to a peripheral edge of the base 26, and the sidewall 21 surrounds the base 26. The sidewall 21 and the base 26 together form a generally cup-shaped structure that defines a valve plug chamber 30 therein. An open end 23 of the sidewall 21 (e.g., the end of the sidewall 21 that is spaced apart from the base 26) has a diameter that is greater than the diameter of the base end 22, whereby the sidewall 21 protrudes at an obtuse angle θ1 (FIG. 5) relative to the base 26. In the illustrated embodiment, the angle θ1 is in a range of 95 to 150 degrees, for example 97 degrees.

In the illustrated embodiment, the valve body 20 includes five valve ports 33, 34, 35, 36, 37, but is not limited to this number of ports. In particular, the valve body 20 includes a first valve port 33, a second valve port 34, a third valve port 35, a fourth valve port 36 and a fifth valve port 37. Each of the valve ports 33, 34, 35, 36, 37 protrudes outward from the sidewall 21 along a radius of the rotational axis 52, and communicates with the valve plug chamber 30. In the illustrated embodiment, the valve ports 33, 34, 35, 36, 37 are cylindrical tubes, and each valve port 33, 34, 35, 36, 37 forms a circular opening at the intersection with the valve body sidewall 21.

In the illustrated embodiment, the valve ports 33, 34, 35, 36, 37 are cylindrical tubes, and each valve port 33, 34, 35, 36, 37 forms a circular opening at the intersection with the valve body sidewall 21. Although, as illustrated, the valve ports 33, 34, 35, 36, 37 each have the same length, cross-sectional shape and dimensions, the valve ports 33, 34, 35, 36, 37 are not limited to this configuration. Moreover, the valve ports 33, 34, 35, 36, 37 are not limited to the illustrated co-planar and radially oriented configuration. For example, in other embodiments, certain ones of the valve ports 33, 34, 35, 36, 37 may be non-co-planar with the other valve ports and/or may protrude from the base rather than the sidewall. The valve ports 33, 34, 35, 36, 37 may protrude in a direction that is parallel to the rotational axis 16, in a direction that is perpendicular to the rotational axis 16 or at any angle between perpendicular and parallel to the rotational axis 16. The valve ports 33, 34, 35, 36, 37 may protrude non-radially; an axis of a given valve port is not required to intersect the rotational axis 16. In many applications, the configuration of the valve ports 33, 34, 35, 36, 37 is determined by packaging requirements.

The valve ports 33, 34, 35, 36, 37, are provided at spaced-apart locations about a circumference of the sidewall 21. In the illustrated embodiment, the first and fourth valve ports 33, 36 are disposed on opposed sides of the valve body 20, extend in parallel to a common diameter of the valve body 20, and are at different levels along a height dimension of the valve body 20. In particular, the first valve port 33 is closer to the valve body open end 23 than the fourth valve port 36 when the valve body 20 is viewed in a direction perpendicular to the rotational axis 52. The second and fifth valve ports 34, 37 are disposed on opposed sides of the valve body 20, are coaxial with a common diameter of the valve body, and share a level with the fourth valve port 36. The third valve port 35 shares a level with the second, fourth and fifth valve ports 34, 36, 37 and is disposed between the second and fourth valve ports 34, 36. Thus, the first valve port 33 resides in a first plane P1 that is perpendicular to the rotational axis 52, and the second, third, fourth and fifth valve ports 34, 35, 36, 37 reside in a second plane P2 that is perpendicular to the rotational axis 52 and spaced apart from the first plane. In the illustrated embodiment, the plane P1 is between the plane P2 and the open end 23 of the valve body 20, but is not limited to this configuration.

The inner surface of the valve body sidewall 21 is provided with grooves 32 that extend between the base end 22 and the open end 23. The grooves 32 have the same cross-sectional shape as the ribs of the seal 110, and are dimensioned to receive ribs of the seal 110 in a press-fit configuration, as discussed further below. The number of grooves 32 provided corresponds to the number of ribs of the seal 110. In the illustrated embodiment, the valve body 20 includes six grooves 32. At least one groove 32 is disposed between the ports of each adjacent pair of valve ports 33, 34, 35, 36, 37. For example, when viewed in a direction parallel to the rotation axis, the first and second ports 33, 34 form a pair of adjacent valve ports, and a groove 32 is disposed between the first and second ports 33, 34. Likewise, a groove 32 is provided between the second and third valve ports 34, 35, between the third and fourth valve ports 35, 36, between the fourth and fifth valve ports 36, 37 and between the fifth and first valve ports 37, 33. The spacing of the valve body grooves 32 about the inner circumference of the valve body 20 depends on the spacing of the valve body ports 33, 34, 35, 36, 37, and therefore may be non-uniform.

The valve body sidewall 21 has a height dimension that corresponds to the distance between the sidewall open end 23 and the sidewall base end 22 in a direction parallel to the rotational axis. In the illustrated embodiment, the height dimension of the valve body 20 is the same as or slightly less than a diameter of the sidewall base end 22.

In some embodiments, a lid (not shown) is provided that closes an open end 23 of the valve body 20, whereas in other embodiments, the open end 23 of the valve body 20 may be closed by a housing (not shown) of the actuator or other ancillary structure. A second seal (not shown) may be disposed between the valve body open end 23 and the lid or housing.

Figure 6:
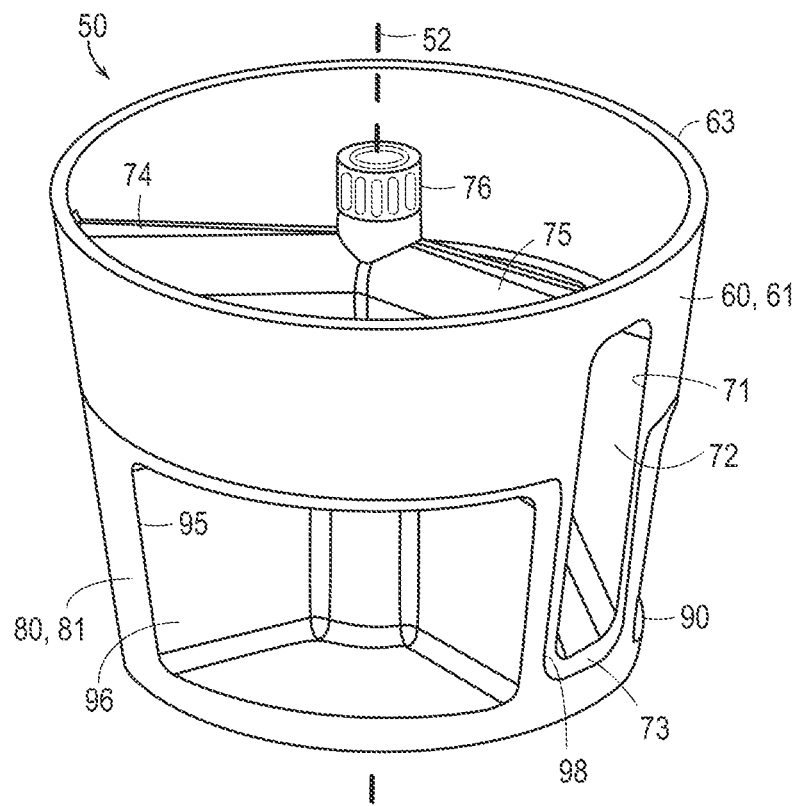
FIG. 6 is a perspective view of the plug assembly of the rotary plug valve of FIG. 2 showing one side of the plug assembly.
Figure 7:
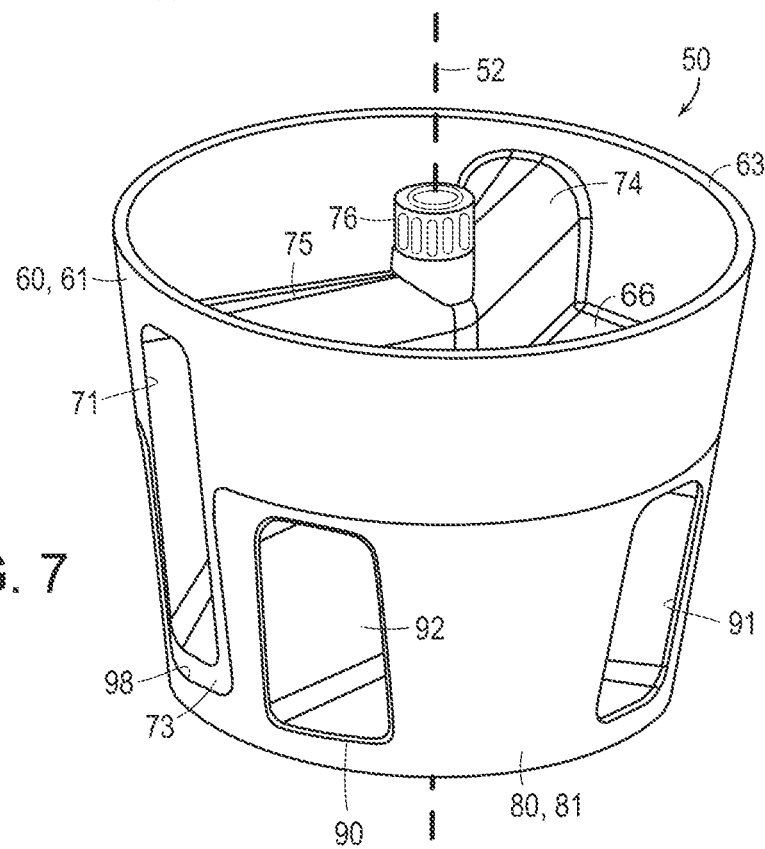
FIG. 7 is another perspective view of the plug assembly of the rotary plug valve of FIG. 2 showing another side of the plug assembly.
Figure 9:
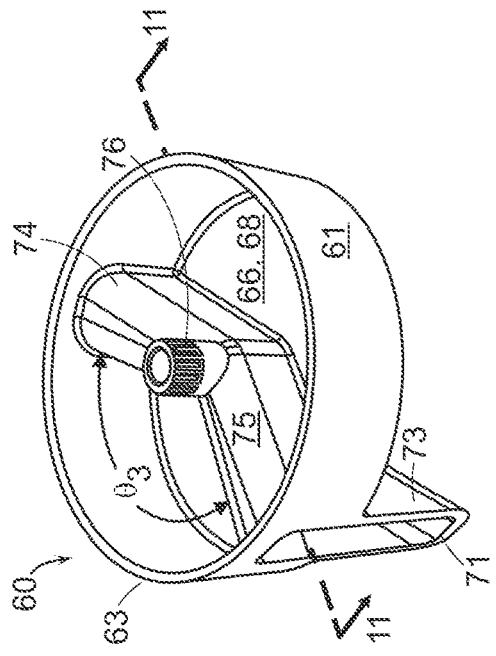
FIG. 9 is perspective view of the first plug portion of the plug assembly of FIG. 6 showing a top view of the first plug portion.
Figure 11:
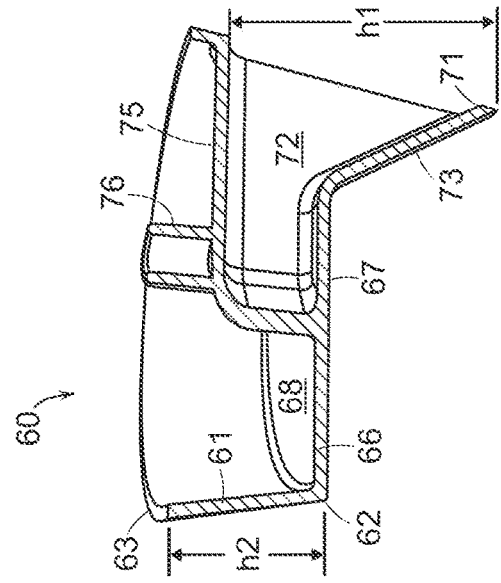
FIG. 11 is a cross-sectional view of the first plug portion as seen along line 11-11 of FIG. 9.
Figure 8:
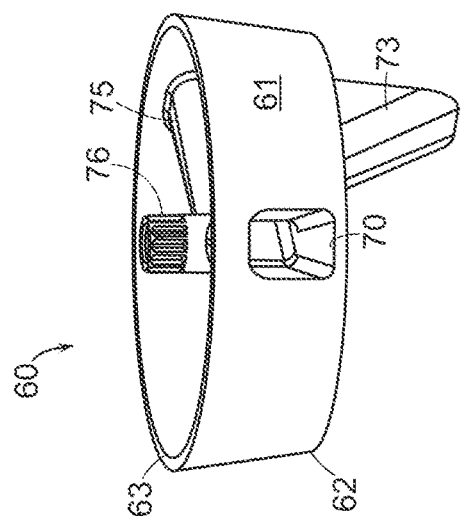
FIG. 8 is a perspective view of the first plug portion of the plug assembly of FIG. 6 showing one side of the first plug portion.
Figure 10:
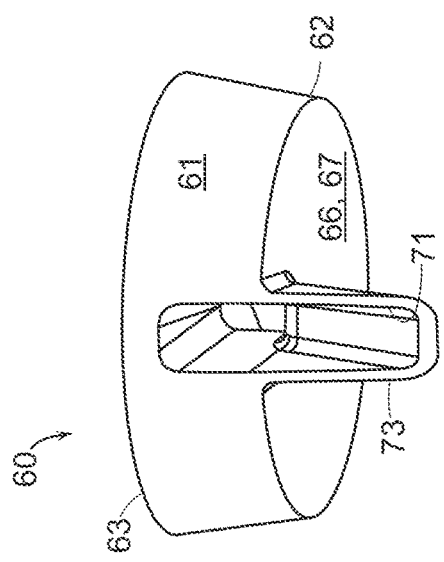
FIG. 10 is perspective view of the first plug portion of the plug assembly of FIG. 6 showing a bottom view of the first plug portion.
Figure 12:
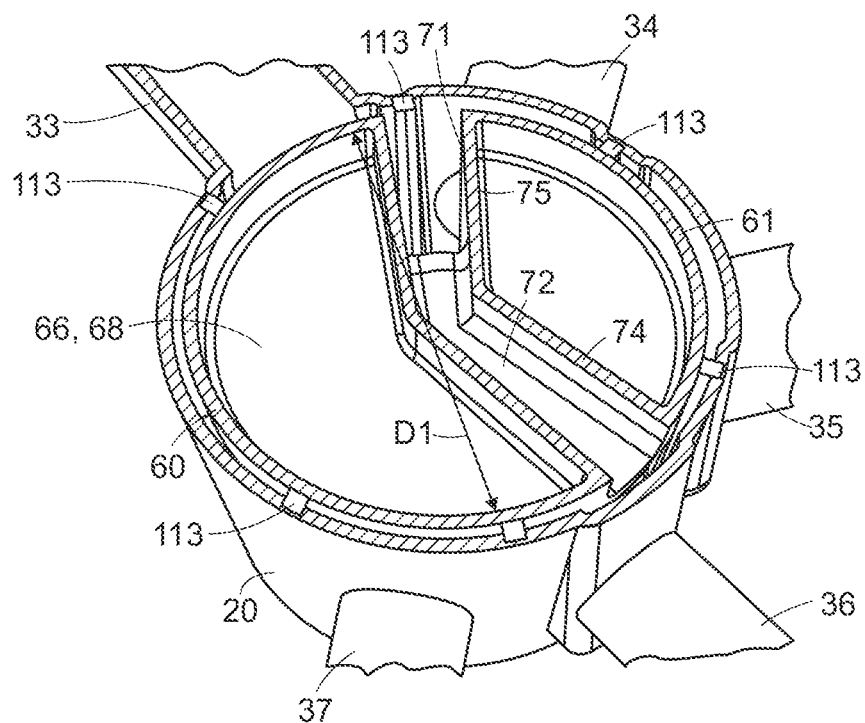
FIG. 12 is a cross-sectional view of the rotary plug valve as seen along line 12-12 of FIG. 2.

Referring to FIGS. 6 and 7, the plug assembly 50 is disposed in the valve body chamber 30, and is rotatable within the chamber 30 about the rotational axis 52. The plug assembly 50 is an assembly of a first plug portion 60 and a second plug portion 80 that are stacked together along the rotational axis 52. The mating surfaces of the first and second plug portions 60, 80 are interlocking, whereby the first and second plug portions 60, 80 rotate in unison and cooperate to control fluid flow through the valve body 20.

Referring to FIGS. 8-12, the first plug portion 60 includes a first base 66, and a first sidewall 61. The first base 66 is parallel to the body base 26, and has a circular profile when viewed in a direction parallel to the rotational axis 52. The first base 66 has an outer surface 67 that faces the body base 26, and an opposed, inner surface 68 that faces away from the body base 26. The first sidewall 61 is joined at one end (referred to here as the "base end") 62 to a peripheral edge of the first base 66. The first sidewall 61 encircles the first base 66, and is centered on the rotational axis 52. The first sidewall 61 and the first base 66 together form a generally cup-shaped structure. An open end 63 of the first sidewall 61 (e.g., the end of the first sidewall 61 that is spaced apart from the first base 66) has a diameter that is greater than the diameter of the base end 62, whereby the first sidewall 61 protrudes at an obtuse angle θ2 (FIG. 5) relative to the first base 66. In the illustrated embodiment, the angle θ2 is in a range 95 to 150 degrees, for example 97 degrees.

The first sidewall 61 includes an alpha opening 70 and a beta opening 71 that are spaced apart along a circumference of the first sidewall 61. With respect to a reference diameter D1 (FIG. 12) of the plug assembly 50, the alpha and beta openings 70, 71 reside on the same side of the reference diameter D1 when the plug assembly 50 is viewed in a direction parallel to the rotational axis 52.

The first plug portion 60 includes a projection 73 that protrudes from the base outer surface 67 and intersects the first sidewall 61 at a location corresponding to the beta opening 71. The projection 73 is hollow, and has the shape of a right rectangular prism. The projection 73 extends along a radius of the first base 66, and has a minimum height dimension at a location between a center of the first base 66 and a peripheral edge of the first base 66. The projection has a maximum height at the first sidewall 61. The projection 73, together with the first sidewall 61, define the beta opening 71, whereby the beta opening 71 has a height dimension h1 that is greater than a height dimension h2 of the first sidewall 61.

The first plug portion 60 includes a first passageway 72 that extends along, and protrudes from, the base inner surface 68. The first passageway 72 extends between the alpha opening 70 and the beta opening 71. The first passageway 72 includes a first linear portion 74 that extends along a radius of the first base 66 between the alpha opening 70 and the center of the first base 66, and a second linear portion 75 that extends along a radius of the first base 66 between the beta opening 71 and the center of the first base 66. An internal angle θ3 (FIG. 9) between the first linear portion 74 and the second linear portion 75 is less than 180 degrees. In the illustrated embodiment, the internal angle θ3 is about 135 degrees.

The first plug portion 60 includes a hollow cylindrical stub 76 that protrudes from an outer surface of the first passageway 72. The stub 76 is coaxial with the longitudinal axis, and has surface features such as flats, axial splines or gear teeth that permit engagement with an output shaft of the actuator, whereby the first plug portion 60 can be driven to rotate about the rotational axis 52 by the actuator. In the illustrated embodiment, the surface features are external. In other embodiments, the surface features may be internal. In the illustrated embodiment, the stub 76 has a low profile in that the sum of the height dimensions of the stub 76 and the first passageway 72 are less than or equal to the height dimension of the first sidewall 61. In other embodiments, the stub 76 may have a high profile and protrude out of the first plug portion 60, as required by the specific application.

Referring to FIGS. 13-17, the second plug portion 80 includes a second base 86, and a second sidewall 81. The second base 86 has a circular profile when viewed in a direction parallel to the rotational axis 52. The second base 86 has an outer surface 87 that faces the body base 26, and an opposed, inner surface 88 that faces away from the body base 26 and toward the first base 66. The second sidewall 81 is joined at one end (referred to here as the "base end") 82 to a peripheral edge of the second base 86. The second sidewall 81 encircles the second base 86, and is centered on the rotational axis 52. The second sidewall 81 and the second base 86 together form a generally cup-shaped structure. An open end 83 of the second sidewall 81 (e.g., the end of the second sidewall 81 that is spaced apart from the second base 86) has a diameter that is greater than the diameter of the base end 62, whereby the second sidewall 81 protrudes at an obtuse angle θ4 (FIG. 5) relative to the second base 86. In the illustrated embodiment, the angle θ4 is in a range of 95 to 150 degrees, for example 97 degrees.

The second sidewall 81 includes delta opening 90, a gamma opening 91 and a zeta opening 95 that are spaced apart along a circumference of the second sidewall 81. With respect to the reference diameter D1 (FIG. 13) of the plug assembly 50, the delta and gamma openings 90, 91 reside on the same side of the reference diameter D1 when the plug assembly 50 is viewed in a direction parallel to the rotational axis 52. In addition, the delta and gamma openings 90, 91 reside on the opposed side of the reference diameter D1 relative to the zeta, alpha and beta openings 95, 70, 71.

The second plug portion 80 includes a second passageway 92 that extends along, and protrudes from, the base inner surface 88. The second passageway 92 extends between the delta opening 90 and the gamma opening 91. The second passageway 92 includes a first linear portion 93 that extends along a radius of the second base 86 between the delta opening 90 and a center of the second base 86, and a second linear portion 94 that extends along a radius of the second base 86 between the gamma opening 91 and the center of the second base 86. An internal angle θ5 (FIG. 15) between the first linear portion 93 and the second linear portion 94 is less than or equal to 180 degrees. In the illustrated embodiment, the internal angle θ5 of the second passageway 92 is less than the internal angle θ3 of the first passageway 72. For example, the internal angle θ5 is about 112 degrees.

Figure 13:
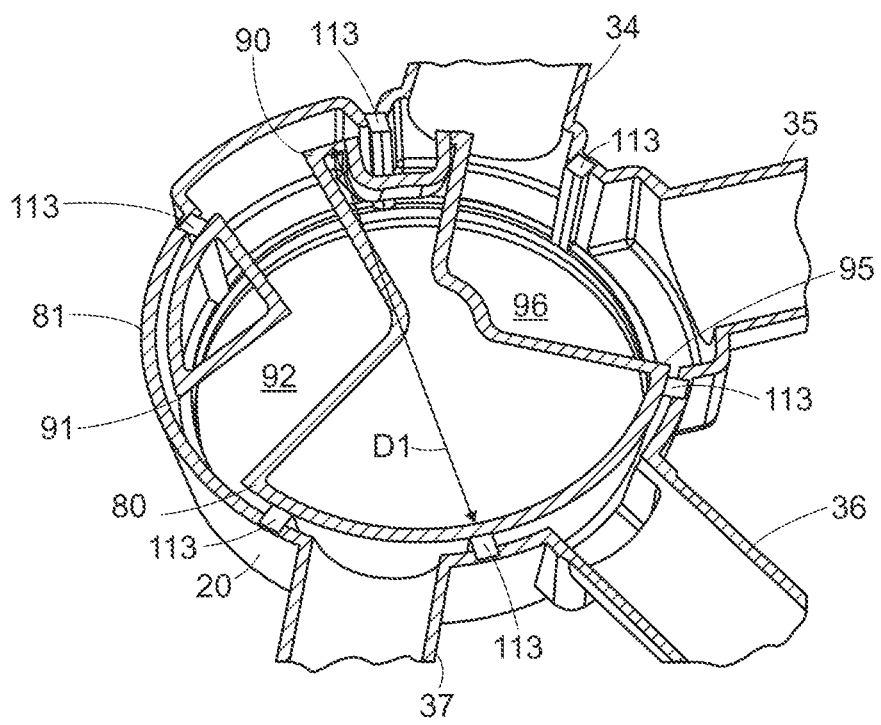
FIG. 13 is a cross-sectional view of the rotary plug valve as seen along line 13-13 of FIG. 2.
Figure 14:
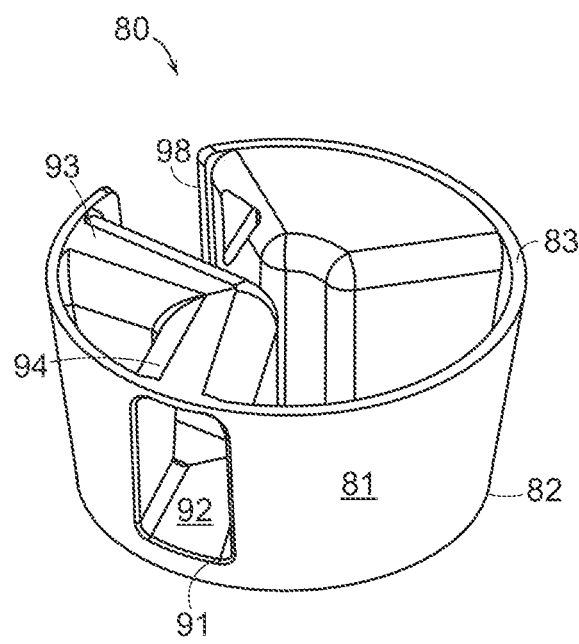
FIG. 14 is a perspective view of the second plug portion of the plug assembly of FIG. 6 showing one side of the second plug portion.
Figure 15:
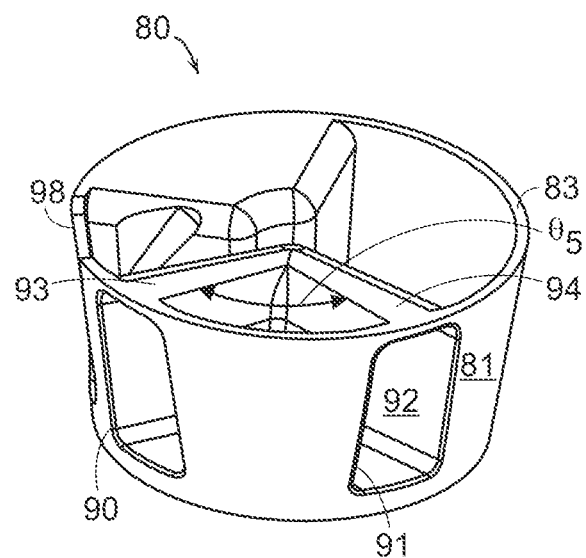
FIG. 15 is perspective view of the second plug portion of the plug assembly of FIG. 6 showing another side of the second plug portion.
Figure 16:
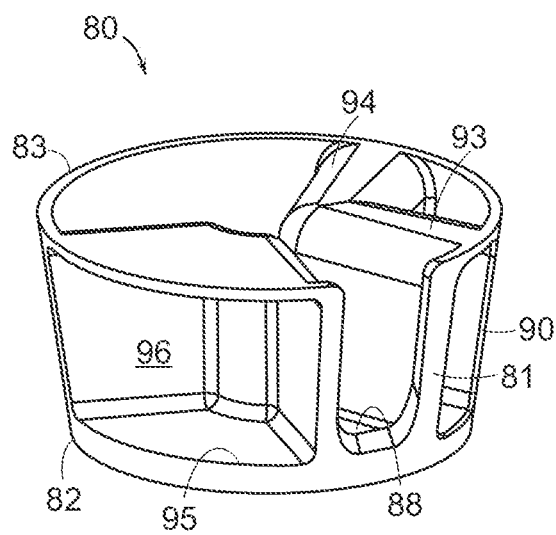
FIG. 16 is perspective view of the second plug portion of the plug assembly of FIG. 6 showing another side of the second plug portion.
Figure 17:
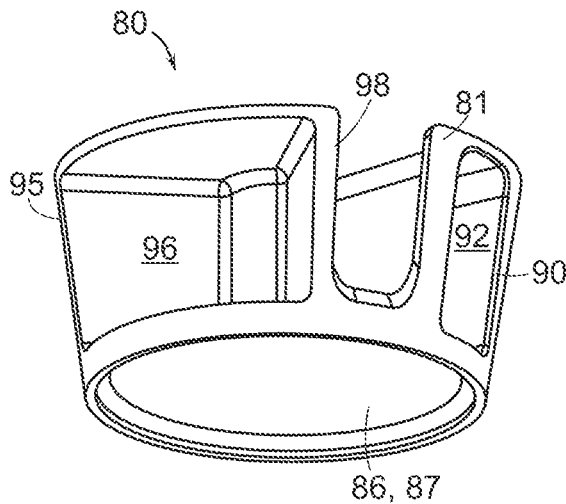
FIG. 17 is perspective view of the second plug portion of the plug assembly of FIG. 6 showing another side and bottom of the second plug portion.

The zeta opening 95 is a blind opening that is configured to connect adjacent valve ports in certain rotational orientations of the plug assembly 50 with respect to the valve body 20. To that end, the zeta opening 95 has a dimension along a circumference of the second sidewall 81 that is at least twice a dimension along a circumference of the second sidewall 81 of the delta and gamma openings 90, 91, whereby the zeta opening 95 has generally a sector shape when the second plug portion 80 is viewed in transverse cross section (FIG. 13). The zeta opening 95 serves as a third fluid passageway 96 extends along, and protrudes from, the base inner surface 88.

The second plug portion 80 includes a recess 98 that is formed in the second sidewall open end 83. The recess 98 is disposed between the zeta opening 95 and the delta opening 90. The recess 98 opens facing away from the second base 86, and is shaped and dimensioned to receive the projection 73 in a tolerance fit. The cooperative engagement between the projection 73 and the recess 98 ensures that the first and second plug portions 60, 80 rotate about the rotational axis 52 in concert with each other.

Referring again to FIGS. 5-7, in the plug assembly 50, the first plug portion 60 is axially aligned with the second plug portion 80 in such a way that the base outer surface 67 of the first plug portion 60 abuts the second sidewall open end 83, and the projection 73 is disposed in, and engaged with, the recess 98. In this configuration, the projection 73 serves as a key that engages the recess 98 in such a way that the first plug portion 60 and the second plug portion 80 are fixed relative to each other and are rotatable about the rotational axis 52 together as a single unit. In addition, the beta opening 71 is partially received within the recess 98, whereby the first passageway 72 can provide fluid communication between the levels of the valve body 20 in certain rotational orientations of the plug assembly 50 with respect to the valve body 20. In the plug assembly 50, the second plug portion 80 is disposed between the first plug portion 60 and the body base 26. The second base 86 is spaced apart from the first base 66 in a direction parallel to the rotational axis 52 with the second sidewall 82 and second and third passageways 92, 96 disposed between the first base 66 and the second base 86. In addition, the first and second sidewalls 61, 81 are aligned.

Figure 18:
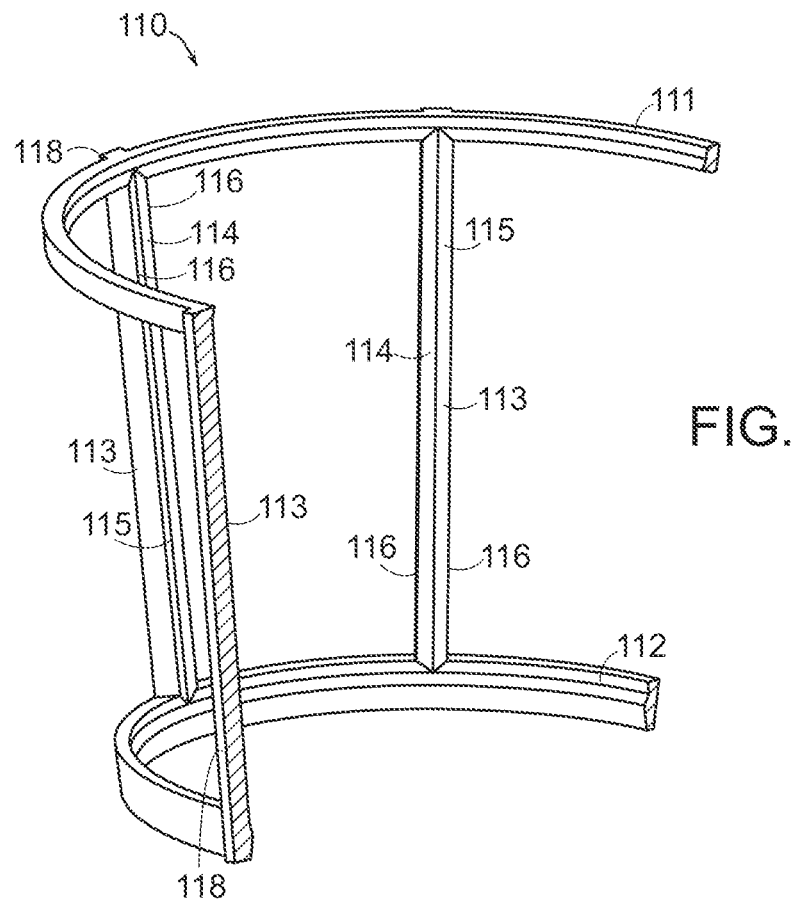
FIG. 18 is a cross-sectional view of the seal as seen along line 18-18 of FIG. 19.
Figure 19:
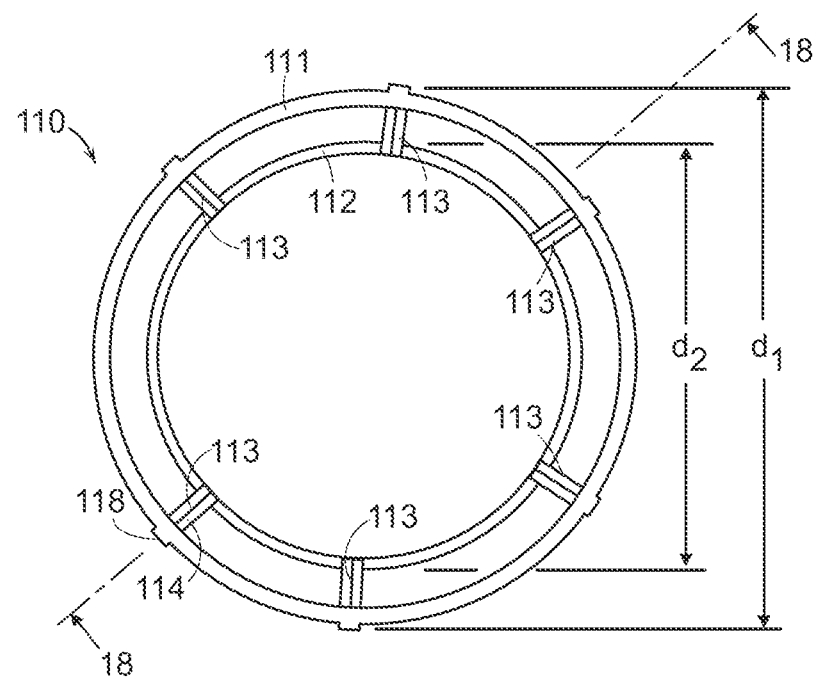
FIG. 19 is a top plan view of the seal.

Referring to FIGS. 18-19, the seal 110 is a cage-like structure that includes a first ring 111, a second ring 112 that is parallel to, and spaced apart from, the first ring 111, and linear ribs 113 that extend between the first ring 111 and the second ring 112. The first ring 111 has a first diameter d1 corresponding to an inner diameter of the valve body 20 at the sidewall open end 23. The second ring 112 has a second diameter d2 corresponding to an inner diameter of the valve body 20 at the sidewall base end 22. Since the valve body has a conical profile in which the sidewall open end 23 has a greater diameter than the sidewall base end 22, the second diameter d2 is less than the first diameter d1. The seal 110 includes an inner surface 114 that faces the rotational axis 52 and the plug assembly 50. The first and second plug portions 60, 80 of the plug assembly 50 abut the seal 110 at the seal inner surface 114.

The ribs 113 are spaced apart from each other about the circumference of the first and second rings 111, 112. At least one rib 113 is disposed between each valve port. In the illustrated embodiment in which the valve body 20 includes five valve ports 33, 34, 35, 36, 37, the seal includes six ribs 113. However, in other embodiments, providing two ribs 113 between a pair of adjacent ports may provide a blocked region or closed port. The particular spacing of the ribs 113 along a circumference of the first and second rings 111, 112 depends on the spacing of the valve body grooves 32, which in turn depends on the spacing of the valve body ports 33, 34, 35, 36, 37 along a circumference of the valve body sidewall 21. Moreover, the relation of the ribs 113 and valve body grooves 32 to the valve ports 33, 34, 35, 36, 37 defines the timing of opening of the valve ports 33, 34, 35, 36, 37.

Each of the first and second rings 111, 112 and the ribs 113 have a rectangular cross sectional shape. In addition, the inner surface 114 of each rib 113 includes a channel 115 that extends between the first ring 111 and the second ring 112. The channel 115 may be shaped and dimensioned to prevent particles or debris carried by the fluid from being retained therein. The channel 115 may also reduce the contact area between each rib 113 and the plug assembly 50. In the illustrated embodiment, the channel 115 may have a V-shaped profile. As a result, the inner surface 114 of each rib 113 includes a pair of parallel lands 116, where one land 116 is disposed on each side of the channel 115. The lands 116 each provide a linear, narrow sealing contact surface between the seal 110 and an outer surface of the plug assembly 50. In some embodiments, the lands 116 that bound the channel 115 may serve to prevent contaminant particles and/or other debris from being trapped in the seal/plug interface, whereby abrasive wear is reduced.

The outer surface (e.g., the valve body-facing surface) 118 of each rib 113 is received within a corresponding one of the axially-extending grooves 32 of the valve body 20. The shape, or cross-sectional profile, of the outer surface 118 corresponds to the shape of the groove 32. In the illustrated embodiment, the outer surface 118 has a rectangular shape to correspond to the rectangular shape of the groove 32.

The seal 110 is formed of an elastic material that is compatible with the fluid that flows through the rotary plug valve 18 and meets the requirements for operating temperature and durability. For example, for a fluid valve used to control fluid in a vehicle coolant system, the seal 110 is formed of an elastomer that is compatible with automotive coolant. In some embodiments, the seal 110 is formed as a single unit in a molding process. By forming the seal 110 as a single unit, the seal 110 is formed without seams (e.g., lines along which two pieces of seal material are joined together) or other joints, whereby the reliability and durability of the seal 110 is improved as compared to some other manufacturing methods.

In some embodiments, the plug assembly-facing surfaces 114 of the seal 110 may include a low-friction coating, whereby these surfaces may have a lower coefficient of friction than the remainder of the seal 110. In other embodiments, the entirety of the seal 110 is coated with a coating that is low friction relative to the elastomer used to form the seal 110. In one non-limiting example, the seal 110 is formed of an elastomer, and the coating is formed of a Polytetrafluoroethylene (PTFE). By providing the seal 110 with a low-friction coating, the torque required to operate the rotary plug valve 18 is reduced. In still other embodiments, the entirety of the seal 110 is formed of a low friction elastomer.

In use, the seal 110 is disposed in the valve body 20 with the first ring 111 adjacent the body sidewall open end 23, the second ring 112 adjacent to the body sidewall base end 22 and with the ribs 113 disposed in the grooves 32. The grooves 32 retain the seal 110 in a fixed configuration relative to the valve body 20 when the plug assembly 50 rotates about the rotational axis 52. The plug assembly 50 is disposed in the valve body chamber 30 with the seal 110 disposed between the plug assembly 50 and the body sidewall 21. In this configuration, the seal first ring 111 surrounds the first plug portion open end 63 and provides a fluid-tight annular seal between the first plug portion 60 and the valve body 20. In addition, the seal second ring 112 surrounds the second plug portion 80 at the second base 86 and provides a fluid-tight annular seal between the second plug portion and the valve body 20. Still further, each valve port 33, 34, 35, 36, 37 is surrounded by a portion of the seal 110 that includes an adjacent pair of ribs 113 and portions of the first and second rings 111, 112 that extend between the adjacent pair of ribs 113, whereby a fluid-tight seal separates each valve port from the other valve ports.

The rotary plug valve 18 includes the valve body 20 having five valve ports 33, 34, 35, 36, 37. The first valve port 33 is disposed at a first level L1 (e.g., at a first axial position), and remaining valve ports 34, 35, 36, 37 are disposed at a second level L2 (e.g., at a second axial position). In addition, the valve plug assembly 50 is disposed in the valve body 20 so as to be sealed relative to the valve body 20 by the seal 110. The valve plug assembly 50, including the interlocking first and second plug portions 60, 80 is rotatable about the rotational axis 52 to control fluid flow through the valve body 20. For example, in one rotational position of the valve plug assembly 50 relative to the valve body 20 (FIG. 20A, FIG. 20B), the first passageway 72 extends between the first and second levels L1, L2, permitting fluid flow between the first valve port 33 and the fifth valve port 37. In this position, the second passageway 92 permits fluid flow between the third and fourth valve ports 35, 36, while the third passageway 96 is not used as it does not align with multiple valve ports. In another rotational position of the valve plug assembly 50 relative to the valve body 20 (FIG. 21A, FIG. 21B), the third passageway 96 is aligned with both the third and fourth valve ports 35, 36 and permits fluid flow therebetween. In this position, the first passageway 72 and the second passageway 92 are not used as they do not extend between valve ports. In another rotational position of the valve plug assembly 50 relative to the valve body 20 (FIG. 22A, FIG. 22B), the second passageway 92 permits fluid flow between the second and third valve ports 34, 35, while the third passageway 96 permits fluid flow between the fourth and fifth valve ports 36, 37. In this position, the first passageway 72 is not used as it does not extend between valve ports. In yet another rotational position of the valve plug assembly 50 relative to the valve body 20 (FIG. 23A, FIG. 23B), the third passageway 96 permits fluid flow between the second and third valve ports 34, 35. In this position, the first passageway 72 and the second passageway 92 are not used as they do not extend between valve ports.

Figure 24:
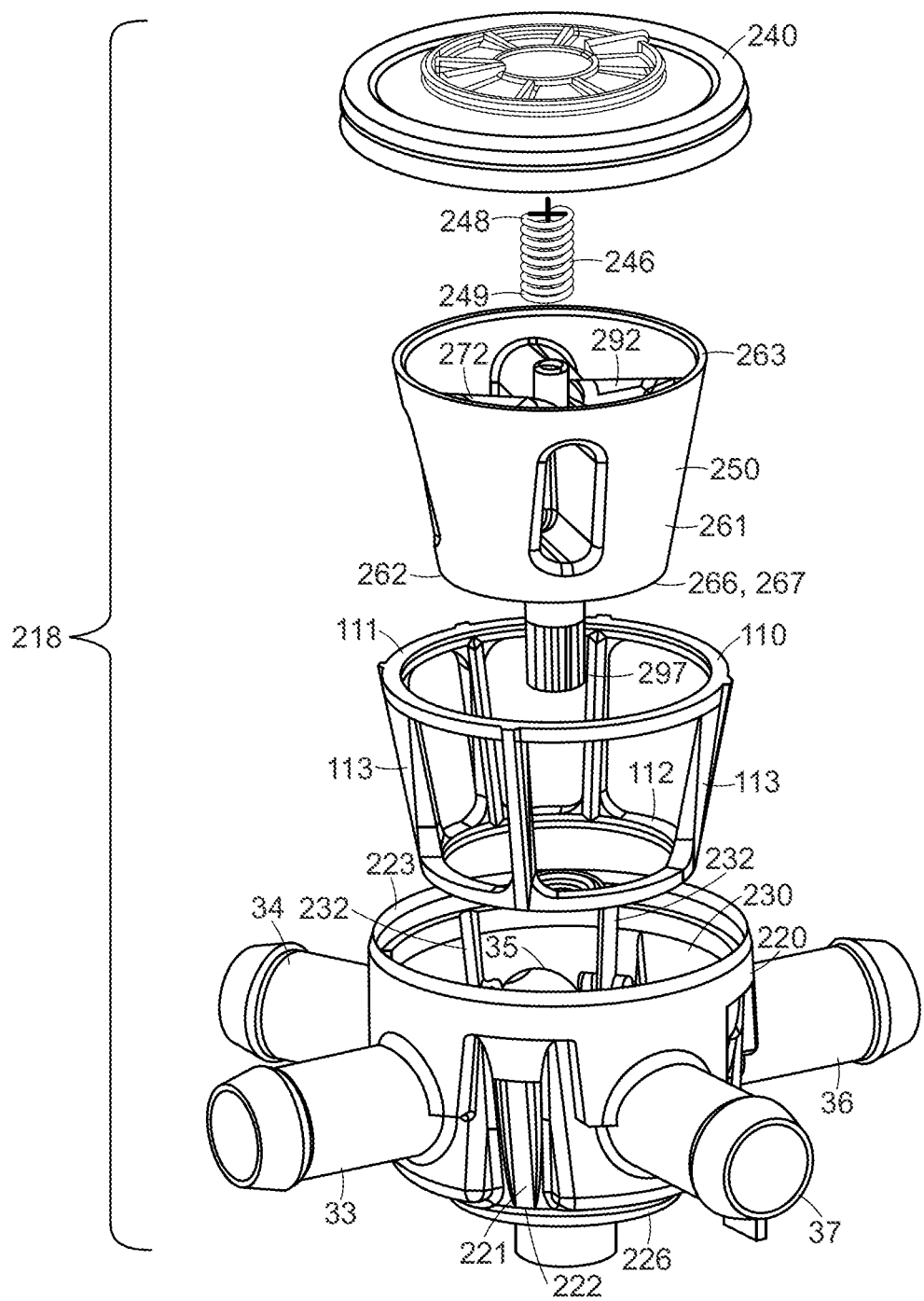
FIG. 24 is an exploded perspective view of an alternative embodiment rotary plug valve.
Figure 25:
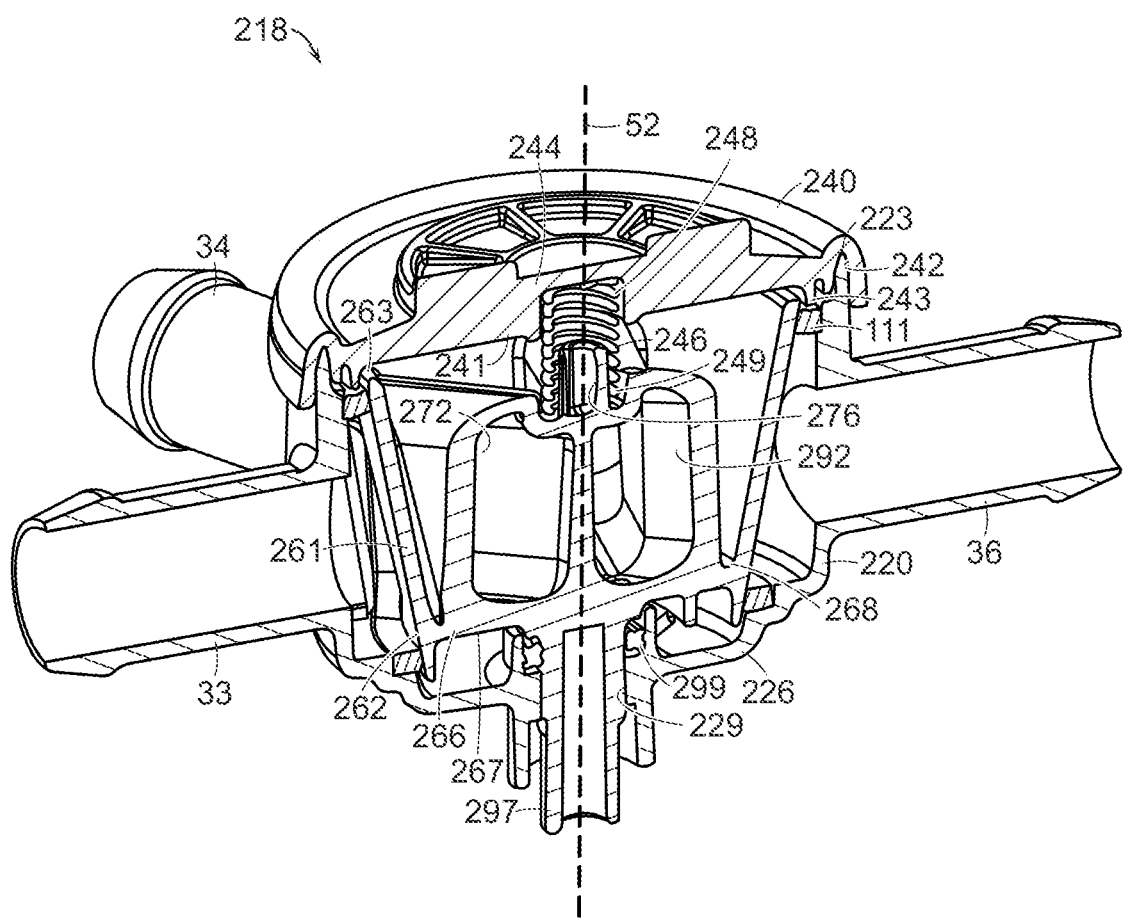
FIG. 25 is a cross-sectional view of the rotary plug valve of FIG. 24.

Referring to FIGS. 24 and 25, an alternative embodiment rotary plug valve 218 includes a valve body 220 and a plug assembly 250 that is disposed in, and rotates relative to, the valve body 220 about a rotational axis 52. In addition, the rotary plug valve 218 includes the valve seal 110 disposed in the valve body 220. As in the previous embodiment, the seal 110 provides a fluid-tight seal between the valve body 220 and the plug assembly 250.

The valve body 220 is similar to the valve body 20 described above in that the valve body 220 includes multiple valve ports 33, 34, 35, 36, 37, the number of ports being determined by the specific application. However, in the rotary plug valve 218, the valve ports 33, 34, 35, 36, 37 are arranged on a single level (e.g., the valve ports 33, 34, 35, 36, 37 reside in a single plane that is transverse to the rotation axis 52). The valve body 220 is similar to the valve body 20 described above in that the valve body 220 includes a base 226, and a sidewall 221. The base 226 has a circular profile when viewed in a direction parallel to the rotational axis 52. The sidewall 221 is joined at the sidewall base end 222 to a peripheral edge of the base 226, and the sidewall 221 surrounds the base 226. The sidewall 221 and the base 226 together form a generally cup-shaped structure that defines a valve plug chamber 230 therein. The open end 223 of the sidewall 221 has a diameter that is greater than the diameter of the base end 222, whereby the sidewall 221 protrudes at an obtuse angle θ1 relative to the base 226. In the illustrated embodiment, the angle θ1 is in a range of 95 to 150 degrees, for example 97 degrees.

In the valve body 220, the inner surface of the valve body sidewall 221 is provided with grooves 232 that extend between the base end 222 and the open end 223. The grooves 232 have the same cross-sectional shape as the ribs of the seal 110, and are dimensioned to receive ribs of the seal 110 in a press-fit configuration. The number of grooves 232 provided corresponds to the number of ribs of the seal 110. In the illustrated embodiment, the valve body 220 includes six grooves 232. At least one groove 232 is disposed between the ports of each adjacent pair of valve ports 33, 34, 35, 36, 37.

The rotary plug valve 218 of FIGS. 24 and 25 differs from the previous embodiment in that it includes a lid 240 that closes the open end of the valve body 220. An inner surface 241 of the lid 240 may include an annular groove 242 that extends along a periphery of the inner surface 241. The groove 242 is shaped and dimensioned to receive the open end 223 of the valve body sidewall 221 in, for example, a press fit engagement. The lid inner surface 241 may also include an annular protrusion 243 that engages the seal first ring 111, whereby the lid 240 is connected to the valve body 220 in a fluid-tight manner. The annular protrusion 243 is disposed between the groove 242 and a center of the lid 240, at a location adjacent to the groove 242.

The rotary plug valve 218 of FIGS. 24 and 25 differs from the previous embodiment in that it includes a spring 246 that is disposed in the valve body chamber 30 between the lid 240 and plug assembly 250. In the illustrated embodiment, a first end 248 of the spring 246 is received in a centrally-located blind hole 244 provided on the lid inner surface 241. In addition, a second end 249 of the spring 246 encircles the stub 276. The spring 246 may be a coil spring that is under compression, whereby the spring 246 applies a force to the plug assembly 250, ensuring a good seal between plug assembly 250 and the seal 110, and between the seal 110 and the valve body 220.

The rotary plug valve 218 of FIGS. 24 and 25 differs from the previous embodiment in that the plug assembly 250 is a single-piece structure that defines two fluid passageways 272, 292 that permit fluid delivery within a single level. The plug assembly 250 is similar to the plug assembly 50 described above in that the plug assembly 250 includes a first base 266, and a first sidewall 261. The first base 266 is parallel to the body base 226, and has a circular profile when viewed in a direction parallel to the rotational axis 52. The first base 266 has an outer surface 267 that faces the body base 226, and an opposed, inner surface 268 that faces away from the body base 226. The first sidewall 261 is joined at the base end 262 to a peripheral edge of the first base 266. The first sidewall 261 encircles the first base 266, and is centered on the rotational axis 52. The first sidewall 261 and the first base 266 together form a generally cup-shaped structure. An open end 263 of the first sidewall 261 (e.g., the end of the first sidewall 261 that is spaced apart from the first base 266) has a diameter that is greater than the diameter of the base end 262, whereby the first sidewall 261 protrudes at an obtuse angle θ2 relative to the first base 266. In the illustrated embodiment, the angle θ2 is in a range of 95 to 150 degrees, for example 97 degrees.

The rotary plug valve 218 of FIGS. 24 and 25 differs from the previous embodiment in that the base 226 of the valve body 220 includes a central opening 229, and the plug assembly 250 includes an input shaft 297 that protrudes outward from the base outer surface 267 and extends through the base central opening 229. An annular seal 299 is disposed between the input shaft 297 and the base 26. The input shaft 297 may be connected to the actuator via a splined connection or other known connecting structures, whereby the plug assembly 250 may be driven to rotate about the rotational axis 52 by the actuator.

Selective illustrative embodiments of the fluid delivery system including the rotary plug valve are described above in some detail. It should be understood that only structures considered necessary for clarifying the fluid delivery system and the rotary plug valve have been described herein. Other conventional structures, and those of ancillary and auxiliary components of the fluid delivery system and the rotary plug valve, are assumed to be known and understood by those skilled in the art. Moreover, while a working example of the fluid delivery system and the rotary plug valve have been described above, the fluid delivery system and the rotary plug valve are not limited to the working example described above, but various design alterations may be carried out without departing from the fluid delivery system and/or the rotary plug valve as set forth in the claims.

What is claimed is:

1. A valve seal, comprising:
a first ring having a first ring diameter,
a second ring that is parallel to and spaced apart from the first ring, the second ring having a second ring diameter that is different than the first ring diameter,
a first rib that extends between the first ring and the second ring, and
a second rib that extends between the first ring and the second ring, the second rib being spaced apart from the first rib along a circumference of the valve seal, wherein
inward-facing surfaces of each of the first rib and the second rib include a channel that extends between the first ring and the second ring, and
an outward-facing projection of each of the first rib and the second rib has a rectangular profile.

2. The valve seal of claim 1, wherein the valve seal is formed integrally as a single unit and is free of a seam.

3. The valve seal of claim 1, wherein the channel has a V-shaped profile.

4. The valve seal of claim 1, wherein
the inward-facing surfaces of each of the first rib and the second rib include a pair of parallel lands,
one land of the pair of parallel lands is disposed on each side of the channel, and
the lands provide a sealing contact surface of the valve seal.

5. The valve seal of claim 1, wherein spacing of the first and second ribs along the circumference of the valve seal is irregular.

6. The valve seal of claim 1, wherein the valve seal is formed of an elastic material.

7. The valve seal of claim 1, wherein the valve seal is formed of a low-friction elastomer.

8. A rotary plug valve, comprising a valve body, a valve plug disposed in the valve body, and a seal disposed between the valve body and the valve plug, wherein
the valve body includes
a body sidewall centered around a body axis,
a body base that closes one end of the body sidewall, the body sidewall and the body base cooperating to define a valve body chamber, and
a plurality of valve ports, each valve port communicating with the valve body chamber,
the valve plug is disposed in the valve body chamber so as to be rotatable relative to the valve body about a rotational axis that coincides with the body axis, the valve plug including
a plug first end,
a plug second end opposed to the plug first end,
a side surface that extends between the plug first end and the plug second end, the side surface surrounding the body axis, and
a plurality of passageways that extend through the valve plug and open at the side surface of the valve plug, and
the seal includes
a first ring having a first ring diameter,
a second ring that is parallel to and spaced apart from the first ring, the second ring having a second ring diameter that is different than the first ring diameter,
a first rib that extends between the first ring and the second ring, and
a second rib that extends between the first ring and the second ring, the second rib being spaced apart from the first rib along a circumference of the seal, wherein
inward-facing surfaces of each of the first rib and the second rib include a channel that extends between the first ring and the second ring, and
an outward-facing projection of each of the first rib and the second rib has a rectangular profile, such that the first ring, the second ring, the first rib, and the second rib are in direct contact with the valve body.

9. The rotary plug valve of claim 8, wherein the seal is formed integrally as a single unit and is free of a seam.

10. The rotary plug valve of claim 8, wherein the inward-facing surfaces of each of the first rib and the second rib face the valve plug.

11. The rotary plug valve of claim 10, wherein the channel has a V-shaped profile.

12. The rotary plug valve of claim 10, wherein
the inward-facing surfaces of each of the first rib and the second include a pair of parallel lands,
one land of the pair of parallel lands is disposed on each side of the channel, and
the lands provide a sealing contact surface of the seal.

13. The rotary plug valve of claim 8, wherein the outward-facing projection of each of the first rib and the second rib is received in at least one groove provided in the body sidewall.

14. The rotary plug valve of claim 13, wherein a shape and dimension of the outward-facing projection of each of the first rib and the second rib corresponds to a shape and dimension of the at least one groove.

* * * * *